(No Model.) 5 Sheets—Sheet 3.

W. H. GRAY.
CORN HARVESTER.

No. 602,157. Patented Apr. 12, 1898.

(No Model.) 5 Sheets—Sheet 4.

W. H. GRAY.
CORN HARVESTER.

No. 602,157. Patented Apr. 12, 1898.

Witnesses: Inventor: William H. Gray,
By Thomas G. and J. Ralph Orwig, Attys.

(No Model.) 5 Sheets—Sheet 5.
W. H. GRAY.
CORN HARVESTER.
No. 602,157. Patented Apr. 12, 1898.
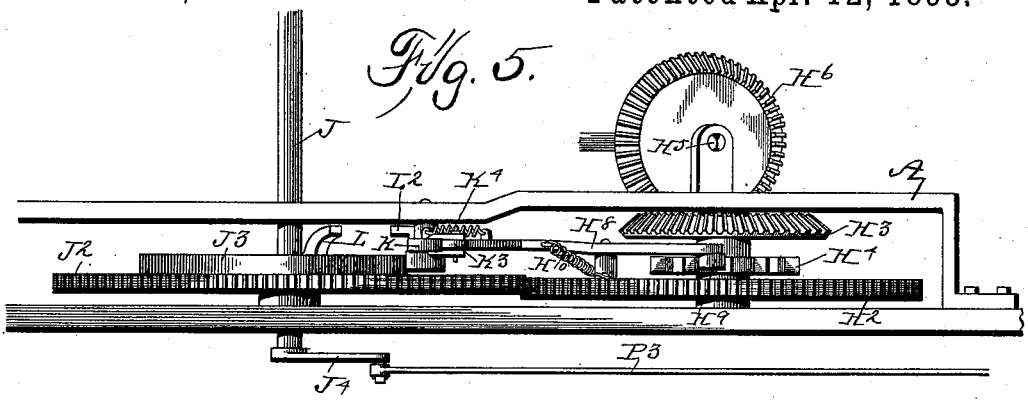
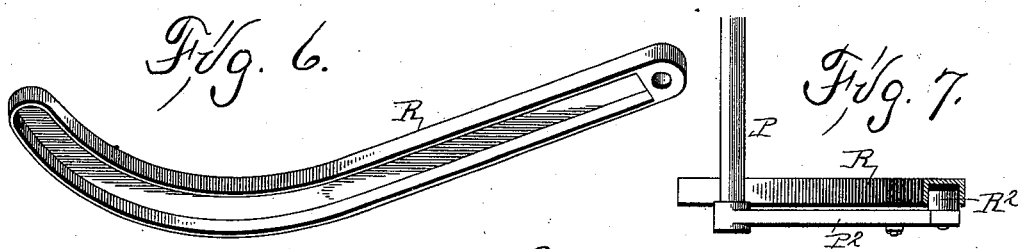
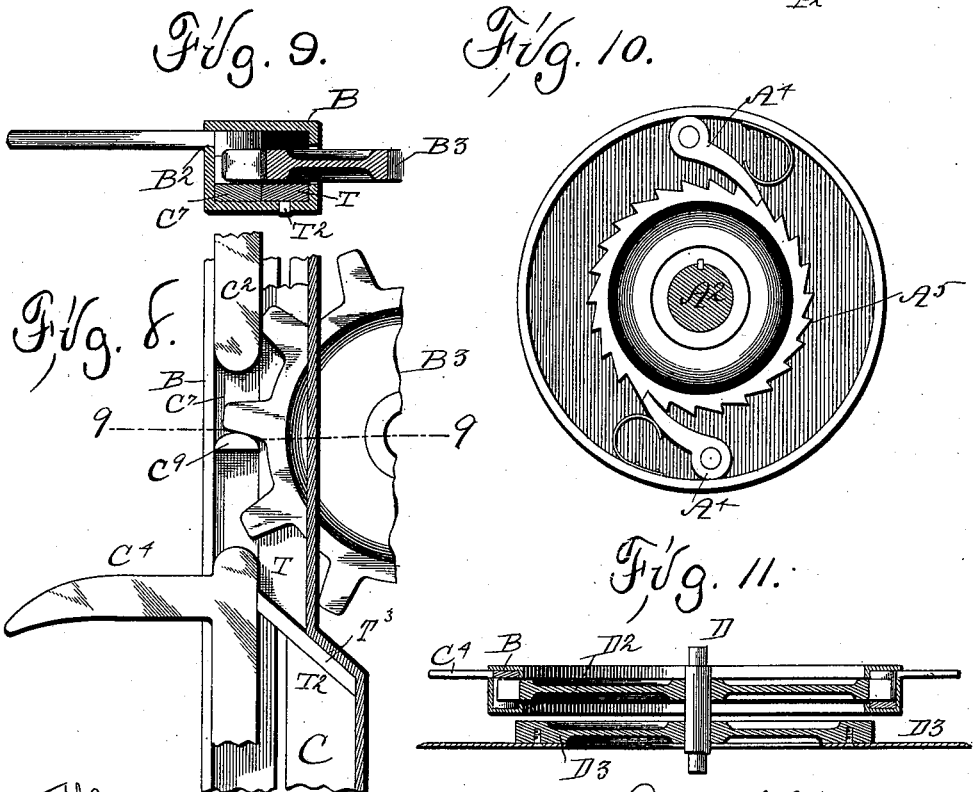
Witnesses: W. J. Sankey, George Allan
Inventor: William H. Gray
By Thomas G. and J. Ralph Orwig, Attorneys.
THE NORRIS PETERS CO., PHOTO-LITHO., WASHINGTON, D. C.

UNITED STATES PATENT OFFICE.

WILLIAM HENRY GRAY, OF EDDYVILLE, IOWA.

CORN-HARVESTER.

SPECIFICATION forming part of Letters Patent No. 602,157, dated April 12, 1898.

Application filed October 26, 1896. Serial No. 610,163. (No model.)

*To all whom it may concern:*

Be it known that I, WILLIAM HENRY GRAY, a citizen of the United States, residing at Eddyville, in the county of Wapello and State of Iowa, have invented a new and useful Corn-Harvester, of which the following is a specification.

This invention relates to that class of machines designed to cut cornstalks, carrying them in an upright position to a shock-former, pack them firmly in said shock-former, and then stand the shock in the field, all by power derived from the traction-wheels of the device.

The objects of my invention are, first, to provide a machine-frame of simple, strong, and durable construction, and, further, to so arrange the traction-wheels therein as to obtain a maximum of power and to apply this power to the best advantage in driving the operative parts of the machine.

A further object is to provide improved means for cutting cornstalks.

A further object is to provide a device of simplified, cheapened, and improved construction for engaging cornstalks in the field, conveying them in an upright position to the shock-former, and packing them firmly in the shock-former.

My object is further to provide means whereby the cornstalks are held from passing to the shock-forming platform during the time that the binding mechanism and the ejecting mechanism are in operation and for conveying the stalks to the binder-platform as soon as the said devices have been withdrawn.

My invention consists in certain details of construction, arrangement, and combination of the various parts of the device, whereby the objects contemplated are attained, as hereinafter set forth, pointed out in my claims, and illustrated in the accompanying drawings, in which—

Figure 1:
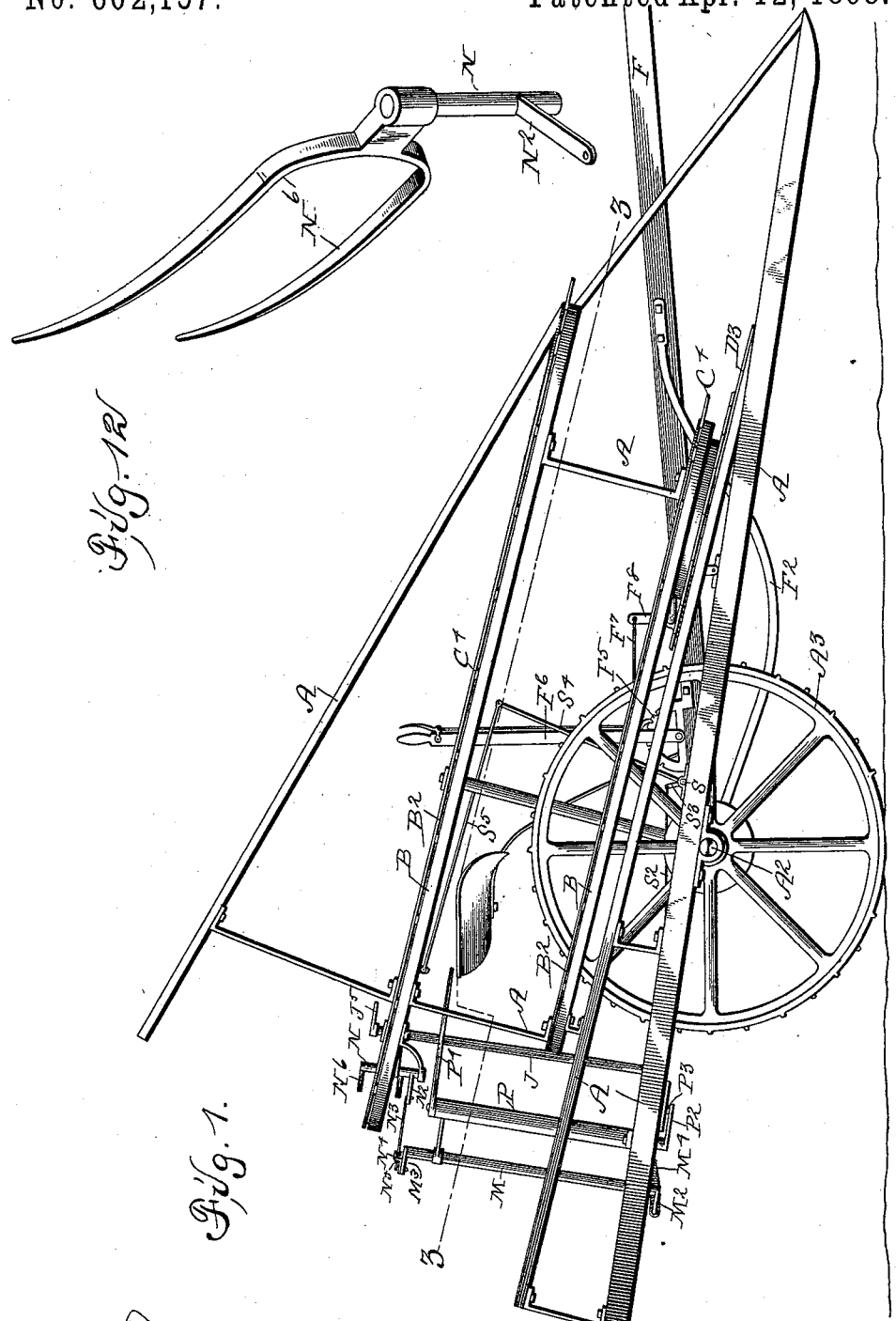
Figure 2:
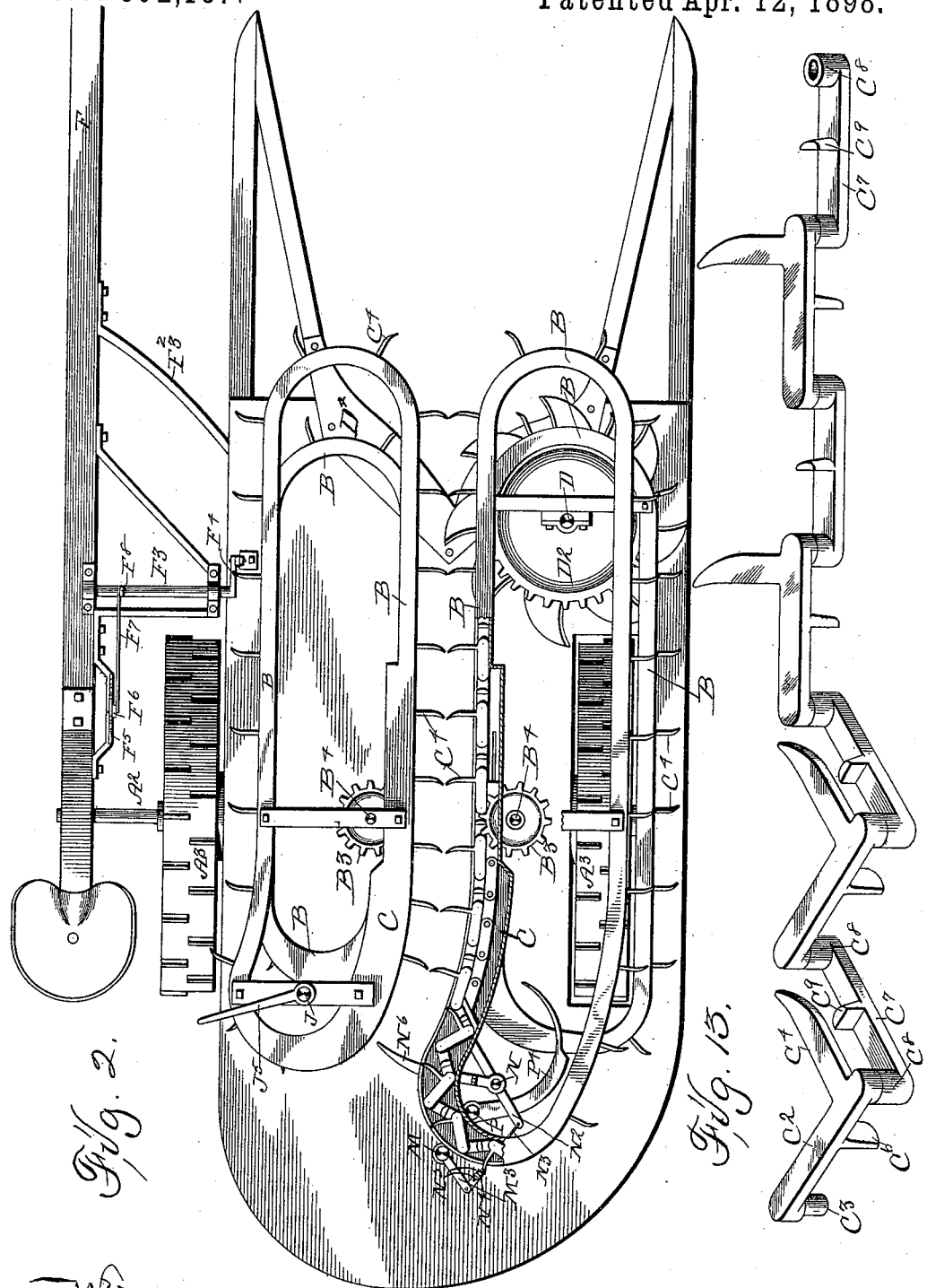
Figure 3:
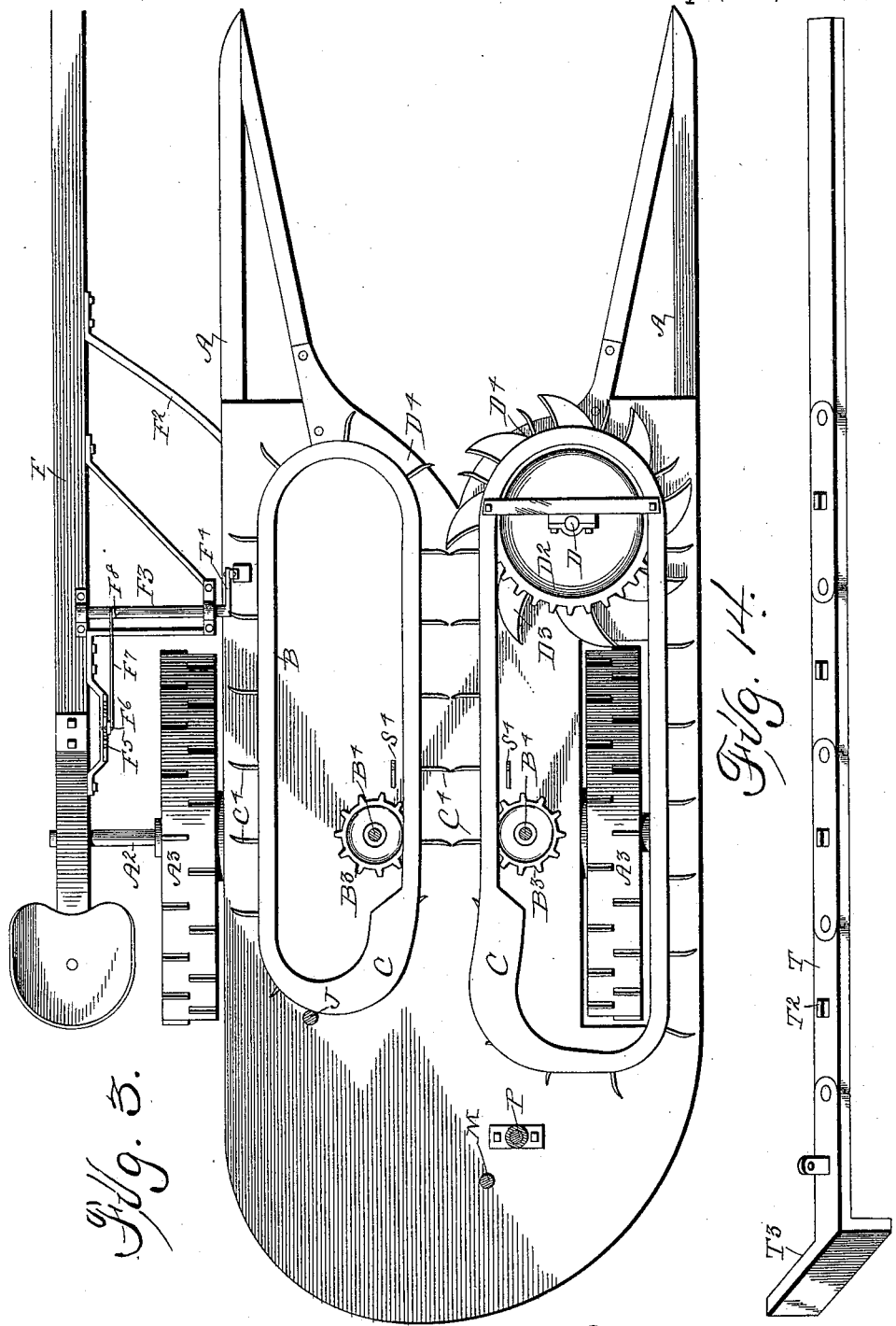
Figure 4:
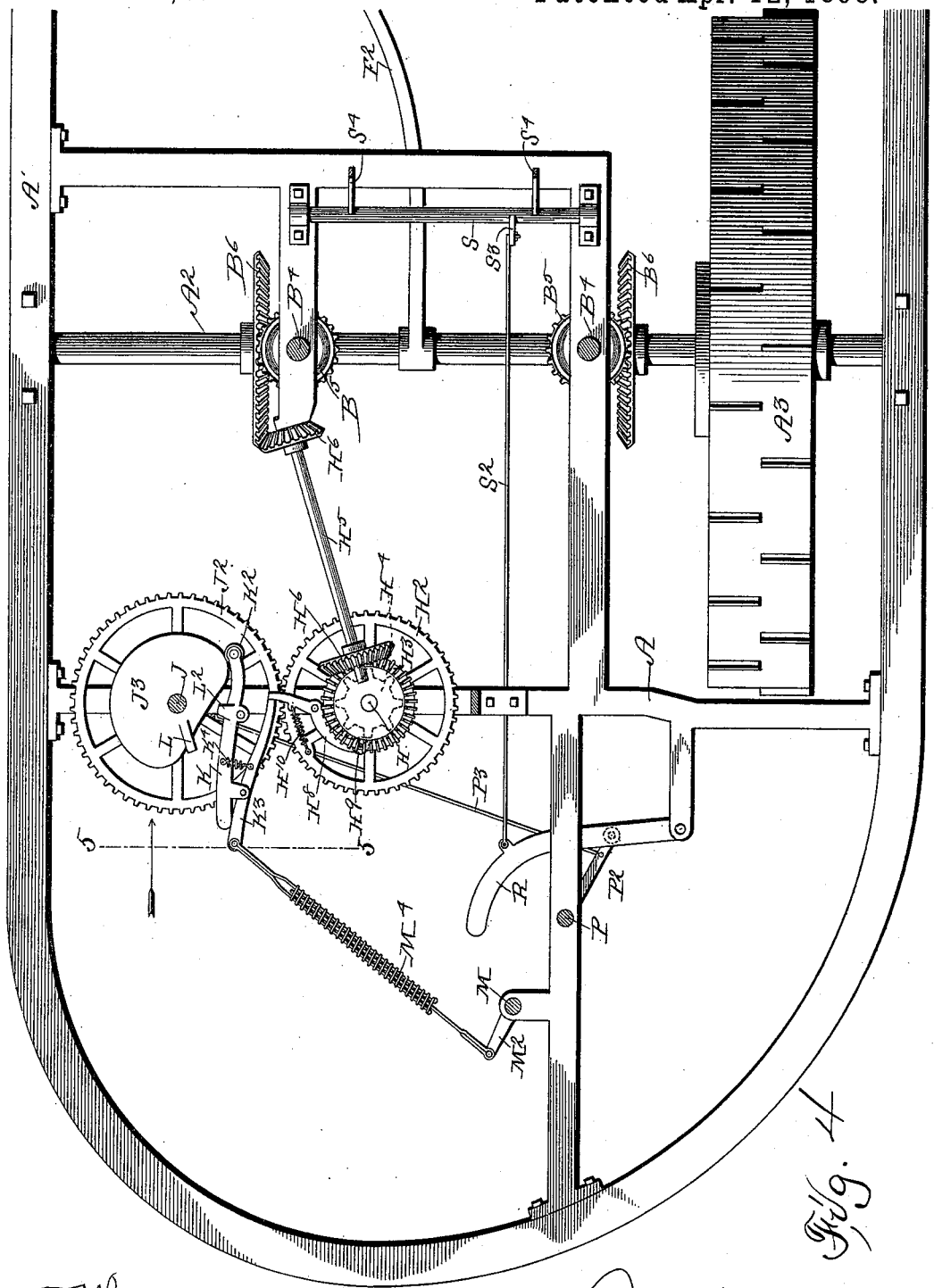

Figure 1 shows a side elevation of the complete machine. Fig. 2 shows a plan view of the machine, a portion of the conveyer-tracks being broken away to show the conveyer, and the guides for the tops of the stalks removed. Fig. 3 shows a sectional view on line 3 3 of Fig. 1, also looking downwardly, with the supports for the upper track-section removed. Fig. 4 shows an enlarged detail view of the mechanism for automatically delivering shocks of corn and for actuating the slides of the packing mechanism as it would appear with the platform removed. Fig. 5 shows a detail sectional view on line 5 5 of Fig. 4, taken from the position indicated by the arrow. Fig. 6 shows a perspective view of the curved channel-bar through which motion is imparted to the slides of the packing mechanism. Fig. 7 shows a transverse sectional view of the same with the arm bearing the antifriction-roller in the channel-bar. Fig. 8 shows a detail top view of a portion of the track, the conveying and packing chain therein, the sprocket for operating the chain, and a portion of the slide for regulating the packing devices. Fig. 9 shows a transverse sectional view through line 9 9 of Fig. 8. Fig. 10 shows a detail side view of the mechanism for connecting the traction-wheels with the axle. Fig. 11 shows a central vertical sectional view of one of the cutting-knives and the sprocket-wheel connected therewith. Fig. 12 shows a perspective view of the forked arm against which the shock is packed. Fig. 13 shows a perspective view of a portion of the conveying and packing chain. Fig. 14 shows a perspective view of the slide for regulating the action of the packing-arms.

In the following description I shall first set forth the general arrangement and combination of mechanisms and later a specific description of such mechanisms where any inherent novelty exists or where the combination with new features makes it necessary.

The reference-letter A is to indicate the main frame of the machine, which is shaped to adapt itself to the mechanisms it carries and also the guides for the stalk-tops.

$A^2$ indicates the main axle, rotatably mounted beneath the central portion of the machine. On its ends the traction-wheels $A^3$ are rotatably mounted, and spring-actuated pawls $A^4$ are located on the wheels to engage ratchet-wheels $A^5$ on the axle, and hence permit a rearward turning movement of either wheel relative to the axle, but not a forward movement. This provides means for turning the machine without sliding one wheel.

Two endless conveyers are located on each side of the machine, the one above the other. They have inwardly-projecting arms to engage and hold the corn stalks in a vertical position, and they are inclined rearwardly and upwardly from the front end. A rotary cutter is located beneath the forward end of the lower conveyer to coact therewith in collecting and severing the stalks, and at the rear end of the machine is a device for packing the stalks into shocks and discharging them into the field when formed.

I shall first describe the general construction and arrangement of the old conveying devices with a view of showing my improved means for driving same. These conveyers contain certain novel features of construction in themselves which will be described hereinafter.

B indicates a continuous track made of hollow rectangular tubing and extended from the front end to the rear end portion of the machine and inclined upwardly at its rear end. Its outer face is slotted at $B^2$ to admit the carrying and packing arms of the conveyer. They are arranged two on each side, the one set being directly over the other, thus engaging a cornstalk at two points. The rear ends of the upper tracks are preferably curved laterally, both in the same direction, to discharge the corn to one side of the row of standing stalks, and the forward ends of the upper tracks are also extended forwardly beyond the lower ones. A chain having laterally-projecting arms at regular intervals is placed in each track and is driven by means of a sprocket-wheel $B^3$, located near the central portion of each chain to engage the inner portion of the chain and push it rearwardly. These sprocket-wheels are fixed to upright shaft $B^4$, and bevel-gears $B^5$ on their lower ends are meshed with the bevel-gears $B^6$ on the axle. Thus power is carried direct to the conveyer-chains and a relatively high degree of power is obtained.

The tracks B are widened at C—that is, from a point near their central portions to their rear ends on the inner portions thereof—to permit a kinking of the chain. The chain is composed of a series of links of two kinds alternately arranged. The one has a straight part $C^2$, with two downwardly-projecting journals $C^3$ at its ends, an arm $C^4$, projecting at right angles therefrom and curved at its outer end, and a downwardly-projecting lug $C^6$ at its central portion. The other kind has a straight flat bottom piece $C^7$, a raised projection $C^8$ at each end, having a central opening to receive one of the journals $C^3$, and also an upwardly-projecting lug $C^9$ at the central portion of the part $C^7$. It is obvious that a chain of this kind when arranged in a track, as described, will travel with the arms $C^4$, projecting outwardly through the slot in the track when drawn taut.

In the present instance the number of links is made so great—that is, the chain is made so much longer than the distance around the track—that some of them must kink or fold, and this is made to take place at the widened portion of the track immediately in the rear of the sprocket-wheels, because the chain is pulled to this point by the sprocket and then pushed from the sprocket into the widened portion of the track. The teeth on these sprockets will engage the projections at the ends of the links and also the lugs on the central portions of the links, thus decreasing the possibility of slipping a sprocket-tooth and also making it possible to use relatively large links with long arms thereon with relatively small sprocket-wheels.

The means for cutting cornstalks comprise a shaft D, mounted in suitable bearings in the machine-frame concentrically in the forward end of the lower track on one side. On its top is a sprocket-wheel $D^2$, which enters an opening in the track and is engaged by the endless carrier-chain, and thereby driven. On the lower end of the shaft is a disk $D^3$, having a series of curved cutting-blades projecting therefrom. These blades are arranged to coact with a flat stationary knife-blade $D^4$, fixed to the machine-frame below the rotary cutters, said knives $D^4$ being curved eccentrically to the shaft D, so that a stalk engaged between the movable knife and the stationary one will be severed by a drawing-shears cut. The stationary knife on the opposite side is so shaped that it will direct all stalks not cut by it toward the juncture of the two knives, so that they also will be severed by the cutting-knife. This arrangement gives a direct and positive pull to the cutting-knife without the use of additional power-transmitting devices.

The tongue F is located at one side of the machine, as usual, and is attached to the end of the axle and also by a brace $F^2$ to the central portion of the axle. $F^3$ indicates a rock-shaft mounted on the tongue pivoted to the machine-frame in advance of the axle and having an arm $F^4$ on its end. A segmental rack $F^5$ on the tongue, a lever $F^6$, pivoted to the rack, and a rod $F^7$, connecting the lever with an arm $F^8$ on the rock-shaft, provide means whereby the forward end of the machine may be raised or lowered relative to the shaft, and hence the height at which cornstalks will be cut may be easily regulated.

I shall next describe the means for setting in motion and operating, the mechanism for advancing the slides in the tracks, the needle for binding the shock, and the arm for discharging the shock from the platform.

H indicates an upright shaft rotatably mounted in the machine-frame beneath the platform. On its lower end a gear-wheel $H^2$ is fixed, and a bevel-gear $H^3$ is loosely mounted thereon above the gear-wheel. Fixed to this bevel-wheel $H^3$ is a toothed wheel $H^4$. Said bevel gear-wheel is constantly rotated during the advance of the machine by means of a shaft $H^5$, having a bevel-gear $H^6$ on each end, one being meshed with the wheel $H^3$ and the other with the bevel gear-wheel $B^6$ on the axle of the traction-wheels. The wheel-gear $H^2$ on the lower end of the shaft H is made to rotate with the bevel gear-wheel $H^3$ by means of a lever $H^8$, pivoted to the lower gear-wheel and having an upwardly-projecting roller $H^9$ on its end that is normally held in engagement with the toothed wheel by means of a contractile spring $H^{10}$. The means for holding this lever out of engagement with the toothed wheel will be described hereinafter.

J indicates an upright shaft rotatably mounted in the machine to extend through the platform and above the upper track.

$J^2$ indicates a gear-wheel fixed to its lower end and meshed with the bevel gear-wheel $H^2$ to be rotated thereby. On its top is a cam $J^3$. Below the gear-wheel is a crank-arm $J^4$, and at the top of the shaft is an arm $J^5$, that serves to remove a shock of corn from the platform when said shaft is rotated.

The means for starting this mechanism automatically, or rather for permitting a revolution of the gears $H^2$ and $J^2$, comprises, first, a lever K, fulcrumed to a stationary support and having on one end a roller $K^2$, which normally engages the cam $J^3$. On its other end a lever $K^3$ is pivoted to a lug on the lever K, and an extensile spring $K^4$ is connected with the levers in front of their pivotal point to normally separate them. When the rear end of the lever $K^3$ is drawn laterally away from the other lever, it is obvious that its opposite end will be thrown outwardly out of engagement with the lever $H^8$, and the spring $H^{10}$ will then hold the roller $H^9$ in engagement with the toothed wheel $H^4$ and both the large gear-wheels rotated one complete revolution. As soon as the pull upon the rear end of the lever $K^3$ has ceased the forward end of the lever will again be thrown outwardly by the spring $K^4$, and it is made to engage the outer end of the lever $H^8$ upon its next revolution by means of the arm L on the cam $J^3$ engaging the lug $L^2$ on the lever K. The cam serves to keep the lever K in position during the operation of the parts, and its flattened side permits the end of the lever K to swing outwardly when the lever $K^3$ is being withdrawn from the lever $H^8$. It is obvious that a pull upon the rear end of the lever K will set in motion the two large gear-wheels and the connected mechanism and that said gears will be automatically stopped after one revolution. I shall first describe the mechanism that sets the said gear-wheels in motion and later the result of the movement of the gears.

M indicates a vertical shaft rotatably mounted in suitable bearings in the machine-frame and having at its lower end an arm $M^2$ and at its upper end an arm $M^3$, extended in an opposite direction.

$M^4$ indicates a contractile spring connected with the end of the lever $K^3$ and the arm $M^2$.

N indicates a shaft mounted near the rear end of one of the upper tracks and having on its lower end an arm $N^2$, which is connected with the arm $M^3$ by means of a rod $N^3$, passed through a lug $N^4$ on the arm $M^3$ and having nuts $N^5$ on the rod on opposite sides of the lug. Thus the length of the rod may be adjusted. On the upper end of the shaft N are two curved arms $N^6$ to extend the one above and the other below the track and across the space between the tracks.

The mechanisms operated by the said large gear-wheels comprise a needle for carrying a cord with which to tie the shock and a device for causing the links of the carriers to kink or fold at different points proportionate to the amount of corn on the platform. Both of these mechanisms receive their motion from the arm $J^4$ in the lower end of the shaft J.

P indicates a shaft mounted in an upright position on the machine-frame and having an arm $P^2$ on its lower end to project forwardly and outwardly. A rod $P^3$ connects this arm with the arm $J^4$. A needle $P^4$ is fixed to the top of this shaft and is intended to be utilized in carrying a twine, which, however, is not shown in the drawings.

R indicates a channel-bar curved laterally at one end and pivoted at its opposite end to a stationary support. The arm $P^2$ has a roller $R^2$ on its outer end to enter the groove in the channel-bar, and when the arm is moved in a segment serves to move the channel-bar also. This motion is transmitted to a rock-shaft S at the central portion of the machine by means of a rod $S^2$, attached to the free end portion of the channel-bar and also to an arm $S^3$ on the shaft S. Two arms $S^4$ are extended upwardly from the shaft S and have rods $S^5$ at their tops, which extend rearwardly to the slides in the tracks, which are constructed as follows:

T indicates a series of flat straight-edged links designed to rest in the enlarged portion of the tracks and having lugs $T^2$ on their under surfaces to enter a slot in the bottom of the track and thus guide the links in their movement in the track. These links are pivoted together, and the end one is provided with a head $T^3$, that extends diagonally across the track to the inside edge of the track. This guide serves the purpose of preventing the links of the conveying and packing chain from kinking or folding until they have passed the head $T^3$, and as the guide is moved backwardly and forwardly in the track the links are made to fold at different positions. The rods $S^5$ are attached to one link of each guide to slide the guide upon a movement of the rock-shaft S.

In practical operation the stalks of corn are carried against the arms $N^6$, and as the bulk of the shock thus formed increases the arms $N^6$ will be pressed rearwardly. When the pressure of these arms $N^6$ has increased sufficiently to overcome the pressure of the spring $K^4$, the arm $K^3$ will be withdrawn from contact with the pawl $H^8$. This will permit the wheels $H^2$ and $J^2$ to rotate. The movement of these wheels will cause the shock to be discharged from the platform and at the same time cause the slide in the covered conveyer-track to move forward and thereby make the links kink or fold in a point in advance of the shock-forming platform. It is understood that the lower conveyers are not provided with this slide for changing the point at which the links kink or fold. Hence the lower ends of the stalks are carried to the platform; but the upper ends are not permitted to pass to the shock-forming platform until the wheels $J^2$ and $H^2$ have made a complete revolution and the said slide again moved rearwardly. By means of this mechanism the tops of the stalks are held from passing to the shock-forming platform during the time that the binding-needle and the discharge-arm are performing their functions.

Having thus described each separate combination of elements, it is believed that their operation as a whole will be readily understood.

What I claim as my invention is—

1. In a corn-harvester or the like, the combination of a continuous hollow track having a laterally-enlarged portion at its inner rear end portion, a conveyer-chain of a length somewhat greater than the distance around the said track composed of a series of links of two kinds alternately arranged, the one having a flat top, two downwardly-projecting journals at its ends, a downwardly-projecting lug at its central portion, and a laterally-projecting arm, and the other having a flat under part two upwardly-projecting ends with openings to receive said journals and an upwardly-projecting central lug, and a sprocket-wheel to engage both the projections on the ends and the central portions of the links, substantially as and for the purposes stated.

2. An endless conveyer-chain, composed of a series of links of two kinds alternately arranged, the one having a flat top, two downwardly-projecting journals at its ends, a downwardly-projecting central lug and a laterally-projecting arm, and the other having two raised ends with openings to receive the journals and a central upwardly-projecting lug, for the purposes stated.

3. In a corn-harvester the combination with mechanism for operating a binding-needle when the shock is formed, of an arm fixed to the shaft of the binding-needle, a roller on its end, a segmental channel-bar pivoted at one end to a fixed support and having said roller in its groove, a rock-shaft in the machine-frame, a crank-arm thereon, a rod connecting it with the free end of the channel-bar, two other crank-arms on said rock-shaft, rods connected therewith, guides attached to the ends of the rods, two continuous tracks and a conveyer-chain in each track of a length somewhat greater than the distance around the said track so that the chain will fold or kink at the end of the guide, substantially as and for the purposes stated.

4. In a corn-harvester, the combination of a continuous hollow track widened at its inner rear end portion, an endless conveyer-chain arranged to fold or kink at one point, a guide composed of a series of straight-edged links having lugs on their lower ends to project through a slot in the bottom of the track, a head on one link to extend diagonally across the track and permit the links to fold or kink at the end and means for operating the slides automatically, substantially as and for the purposes stated.

WILLIAM HENRY GRAY.

Witnesses:
W. R. NELSON,
F. W. STEINHOFF.